(12) United States Patent
Stephens et al.

(10) Patent No.: US 8,590,489 B2
(45) Date of Patent: Nov. 26, 2013

(54) WEIGHTED LARIAT

(76) Inventors: Sandy Stephens, Prosper, TX (US);
Anthony William Benishek, Southlake, TX (US)

( * ) Notice: Subject to any disclaimer, the term of this patent is extended or adjusted under 35 U.S.C. 154(b) by 345 days.

(21) Appl. No.: 12/454,544

(22) Filed: May 19, 2009

(65) Prior Publication Data
US 2010/0132630 A1    Jun. 3, 2010

Related U.S. Application Data (63) Continuation-in-part of application No. 11/538,469, filed on Oct. 4, 2006, now abandoned.

(60) Provisional application No. 60/729,550, filed on Oct. 24, 2005.

(51) Int. Cl.
*A01K 15/04* (2006.01)

(52) U.S. Cl.
USPC ............................................. 119/805

(58) Field of Classification Search
USPC ............................. 119/801, 802, 805
See application file for complete search history.

(56) References Cited

U.S. PATENT DOCUMENTS

| | | | |
|---|---|---|---|
| 504,055 A | 8/1893 | Shaw | 119/153 |
| 1,438,593 A | 12/1922 | Pullington | |
| 1,438,993 A * | 12/1922 | Fullington | 57/202 |
| 1,868,681 A * | 7/1932 | Wyatt | 57/231 |
| 1,953,565 A | 4/1934 | O'Neil | |
| 1,993,010 A | 3/1935 | La Rue | |
| 2,044,240 A | 6/1936 | Daniels | |
| 2,503,567 A | 4/1950 | Sweetman | |
| 2,643,638 A | 6/1953 | Villner | 119/153 |
| 2,669,221 A | 2/1954 | Major | |
| 2,771,857 A | 11/1956 | Soreghen | |
| 3,165,091 A | 1/1965 | Welton | |
| 4,648,352 A * | 3/1987 | Smith | 119/805 |
| 6,119,632 A | 9/2000 | Sullivan | 119/805 |
| 6,168,539 B1 * | 1/2001 | Maina | 473/424 |
| 6,789,509 B1 | 9/2004 | Motsinger | 119/805 |
| 2006/0217211 A1 | 9/2006 | Cadotte | |

* cited by examiner

*Primary Examiner* — Rob Swiatek
*Assistant Examiner* — Kathryn L Thompson (57) ABSTRACT

The present invention comprises a weighted lariat that improves ropers' chances of catching animals by the head, horns, or feet, particularly in competitive roping events. Weight is added to the tip of the loop by covering a portion of the loop with shrink-wrap tubing. Additionally, an adhesive lining may be applied to allow for a weighted embodiment of minimum thickness thus and maximum flexibility. Additionally, elongated, malleable metal wires of variable length can be laid in the groove between the strands of the lariat thereby adding still more weight.

10 Claims, 5 Drawing Sheets

WEIGHTED LARIAT

CROSS-REFERENCE TO RELATED APPLICATIONS

This application is a continuation-in-part patent application to application Ser. No. 11/538,469 filed on Oct. 4, 2006 now abandoned, which claims priority of provisional application Ser. No. 60/729,550 filed Oct. 24, 2005.

TECHNICAL FIELD

This invention relates to lariats used for roping the head, horns, or heels of various animals, but predominantly those of the bovine species, in rodeos and competitive roping contests wherein the lariats comprise a loop having a weighted portion to facilitate improved control and action when the lariats are swung and delivered by ropers.

BACKGROUND AND SUMMARY OF THE INVENTION

Lariats are well known in the art, and are used for various purpose. Historically, the most prominent use has been to catch animals such as cattle so that they may be marked or medically treated. However, today the primary use for lariats is in competitive rodeo and roping contests such as team roping—which involves the act of heading, or roping the animal around the head or horns, and a separate act that involves heeling, or roping the animal around the legs—steer roping, and calf roping. The contestants of such events will henceforth be referred to as ropers.

When lariats first came into use, they were comprised of rope made of natural fibers such as rawhide, manila or other type of grass (which was and is often combined with lead or metal alloy strands to impart additional weight). Over the last 50 years, rope used for lariats has almost exclusively been constructed with synthetic fibers such as nylon and polyester, although grass ropes still hold a small market share.

To form a lariat, a length of rope has a honda at one end, through which the opposite end, known as the tail, is drawn through in order to form a loop. The tip of the honda is typically covered by a burner, which is a piece of rawhide that is sewn or plastic that is shrunk onto the honda to decrease friction and improve the performance and longevity of the rope. The majority of the length of rope extends through the honda and is typically wound by ropers into coils for ease of holding, carrying, and releasing when the loop is thrown or delivered. The remaining portion from the point immediately behind the honda and back around to the honda constitutes the loop. In order to swing and throw the loop, the roper grabs a portion of the loop and a portion of the rope between the honda and the coils. The portion of rope between the honda and the roper's hand where the lariat is held is referred to as the spoke. The portion of the loop furthest from the roper's hand when the roper swings the loop is known as the tip of the loop.

Although the composition of lariats has changed over time, the fundamental design aspect being a uniform strand of rope, with uniform composition, diameter, density and pliability along the entire length of the lariat from the honda to the tail, has remained constant within the market. Even with U.S. Pat. No. 4,648,352, ropes with a weighted tip have not been successfully introduced into the market. Thus, the mechanical performance, or "action", of lariats of like material composition, diameter, density, and pliability, has changed little over time.

Lariats are widely used in competitive, timed roping contests such as team roping, steer roping, and calf roping. Team roping includes two participants commonly referred to as the "header" and the "heeler". The header is positioned on the left side of the steer, and the heeler on the right. The timing of the event begins when the steer is allowed to run down the arena. While running down the arena, generally at a speed between 20 and 30 miles per hour, the header throws his loop attempting to catch both horns or the neck of the steer—but preferably the horns—and if successful, proceeds to wrap the lariat around the saddle horn and rein the horse to guide the steer to the left. The heeler then delivers his loop, attempting to capture the two hind legs, while simultaneously stopping his horse. If successful, the heeler wraps the lariat around the saddle horn thus stopping the steer. Once both the header and the heeler are successful and their horses are facing each other the timing is stopped. If the heeler only catches one hind leg, a penalty (usually 5 seconds) is assessed to the time. Generally, the fastest team to complete this task wins the competition. In most competitions, highly-competitive teams will complete the task in three to ten seconds.

The majority of headers generally have an understanding of and certain capability to heel, and vice versa. However, team ropers generally develop a preference for and greater skill toward either heading or heeling, and normally do not change from one to the other with regularity, particularly at a single event, generally because of the difference in swing and delivery technique, different horse requirements, and different lariat requirements. Most team ropers only switch to perform the opposite task on occasion.

Steer roping includes just one participant (a steer roper) who is mounted on horseback with a lariat, as well as a steer that is positioned in a chute. Again, the timing of the event begins when the steer is allowed to run down the arena, and the mounted participant chases the steer until the participant is able to rope the steer about the horns or neck, but preferably the horns to avoid choking the steer. The participant then lays the rope over the right side of the steer and reins the horse to the left, thus causing the steer to lie on its side. The roper then dismounts, runs to the steer, and ties three of the steer's legs together so that it cannot get up, at which time the timing is stopped. Competitive steer ropers generally complete this task in nine to twenty seconds. The lariat action that is most affective for a steer roper is generally the same as it is for a header, although a steer roper will prefer that the curl be more pronounced and lay further to the right side of the steer to expedite the placing of the rope on the right side of the steer.

Calf roping includes just one participant (a calf roper) who is mounted on horseback with a lariat, as well as a calf that is positioned in a chute to the participant's left or right. Again, the timing of the event begins when the calf is allowed to run down the arena, and the mounted participant chases the calf until the participant is able to rope the calf about the neck or other part of the calf's body. The participant then dismounts and runs to the calf, throws the calf on its side, and ties three of the calf's legs together so that it cannot get up, whereupon timing is stopped. Competitive calf ropers complete this task in six to ten seconds.

As the time to complete the tasks in competitive roping is so short, the performance of the equipment used by the participants, and in particular the lariat, is of utmost importance. A lariat that is heavier and less pliable for instance, than another rope, will have a significantly different mechanical action that may be more effective for a heeler, but likely be much less effective for a header. Thus, the mechanical action of the lariat, and more specifically the loop, is a critical element in determining the success or failure to capture the animal, and to a lesser extent, the speed of capturing that animal. The lariat a roper selects for the specific task of roping the head, horns or legs, will and should almost always vary based on whether the intent is to capture the head, horns or legs.

There are at least 1,600 different ropes on the market, each of which has one or more varying properties of material composition, cross-sectional diameter, weight, density, color, wax coating, texture, and pliability, each combination of which is designed to perform the specific task of roping the horns, head, or neck most effectively for the various styles and preferences of individual ropers. One of the key differences among all of the lariats on the market, and arguably the most important element in the selection of the lariat by a roper, is the pliability, also referred to as flexibility (or stiffness) or flexural modulus, which in the industry is commonly referred to as the "lay".

The lay of the lariat is primarily determined by the number of twists of the strands of the rope within a given length. The higher the number of twists, or the tighter the rope is wound, the stiffer the rope will become, and thus the stiffer the lariat with which it is constructed. The available range of lays within the market, from most pliable (lowest flexural modulus) to least pliable (highest flexural modulus), is as follows: extra-extra-soft, extra-soft, soft, medium-soft, medium, hard-medium, medium-hard, and hard. Various manufacturers may use slightly different terminology for the various lays. Although there is no standard method for measuring lay, to appreciate the relative difference in the flexibility from one lay to the next, one may envision a 15-inch section of rope held parallel to the horizon. If a two-ounce weight is added to the end of the rope, each sequentially softer lay will deflect an additional inch toward the ground. Thus, an extra-extra-soft head rope will deflect about 8-inches, while a hard rope will deflect a mere 1-inch.

Another key difference among lariats on the market is the density of the rope, which affects the mass of the loop, and more importantly the mass at the tip of the loop. Generally, the smaller the diameter of the rope, the easier it is to swing the loop. However, the less the mass of the loop, the more difficult it becomes for the roper to feel and control the tip of the loop, and to obtain the desired action from the loop upon delivery, particularly considering that roping competitions often occur in outdoor venues where wind conditions are often prevalent. It is well known within the industry that the density of the rope and the mass at the tip of the loop are of significant consequence. This is evidenced not only by U.S. Pat. No. 4,648,352 issued to Smith on Mar. 10, 1987, but also by U.S. Pat. No. 5,941,198 issued to Sullivan on Aug. 24, 1999.

The present invention contains substantial improvements over the prior art, and in particular over U.S. Pat. No. 4,648,352 issued to Smith. Smith discloses adding weight to the loop of a heeling rope, either by covering a portion of the loop with leather stripping, and tapering the ends, by covering a portion of the loop with molded plastic, and tapering the ends, by inserting a weighted member along the centerline of the lariat, or by wrapping additional strands of rope or twine around the lariat. Smith's methods result in a slight stiffening of the weighted portion, as recognized by Smith.

The present invention comprises covering a portion of the loop of a lariat used for heading, heeling, steer roping, or calf roping, with a length of shrink-wrap tubing and an adhesive that function as an apparatus for weighting the tip of the loop. The adhesive is applied with the shrink-wrap tubing to further increase the weight, durability, and longevity, while maintaining the flexibility necessary for head and calf ropes. Furthermore, the adhesive will create an even greater tendency for the ends of the tubing to adhere to the rope, eliminating the need to taper the ends, and decreasing the chance that the ends of the tubing will impact the performance of the roe. The optimum characteristics of the shrink-wrap tube weighting embodiment are:

2:1 shrink ratio;
elastic adhesive pre-applied inside the shrink-wrap tube;
recovery (shrink) temperature of 105 degrees Fahrenheit;
recovered wall thickness of 0.25 mm;
resulting in a diametrical increase of less tan 6%;
and an overall weight increase of less than 15%.

This method presents substantial improvements to the prior art for the following reasons:

a. The present invention is substantially thinner than the methods claimed by Smith, thus, eliminating the need to taper the ends of the apparatus.
b. The present invention is substantially more pliable than Smith's methods, which makes it applicable to all lays of lariat ropes, including those used primarily by headers, steer ropers, and calf ropers.
c. The present invention is lighter than Smith's molded plastic invention, and thus easier to operate for a header, a heeler, a calf roper, and a steer roper.
d. The present invention is uniform in cross-section, which has less of an impact on the pliability of the rope.
e. The present invention will have a greater tendency to adhere to the rope, and will have less affect on and be less affected by the action of extracting the slack, and thus will be more practical and more durable than the methods disclosed by Smith, particularly for the purposes of weighting a lariat used for heading, steer roping or calf roping.

To understand the critical differences that must be considered in the weighting of a head rope and a calf rope, and why one familiar with the art of weighting a heel rope via the methods of the prior art would not be able to effectively apply the same technology to a lariat used for heading or calf roping, and why significant research and development would be required to determine how to properly weight a head rope and a heel rope, and why it would not be a simple matter of design choice, one must first understand the fundamental mechanical differences in the action of a lariat used for heading, steer roping or calf roping, as compared to one used for heeling.

In order to understand how weighting mechanisms such as those disclosed by Smith for weighting a lariat for heeling will not suffice to weight a softer lariat used for heading or calf roping, and why it would neither be obvious nor necessary for one skilled in the art of weighting a heel rope to understand the intricacies of weighting a lariat for heading or calf roping, one must first have a clear understanding of the desired action of a lariat used for heading or calf roping as compared to the desired action of a lariat used for heeling. One must also understand that while minor variations in thickness, uniformity, density, and adhesion to the lariat for an apparatus may have a non-consequential impact on a heel rope, such variations will have drastically different and undesired affects on a lariat used for heading or calf roping. Thus weighting a head rope or a calf rope is a much more precise art, and is limited to a vary narrow range of acceptable criterion, a range which would not be obvious, nor necessarily understandable, nor easily discovered, by one skilled in the art of weighting a heel rope. The criteria for an apparatus for weighting a head rope and a calf rope is governed primarily by the required flexibility of the rope, and the drag that is imparted on the rope, which are significantly different for head ropes and calf ropes, as compared to heel ropes.

The reason that the mass at the tip of the loop affects the action of the loop is because the mass directly affects the angular momentum of the loop, which impacts the tendency of the loop to rotate around the horns, neck or legs of the animal desired to be caught. However, the mechanics of how the angular momentum of the loop is utilized to impart rotation in the tip to capture the head or neck is significantly different than how this momentum is harnessed to rotate the loop around the legs. The size of the loop and desired action of the loop used to catch a steer or a calf by the horns or head is significantly different than that used to catch the legs. Additionally, the action of the loop upon and after the loop is delivered, and while the slack is drawn, is significantly different for a lariat used for heading and calf roping, than it is for a heeling lariat. Thus, any appurtenance that is designed to be added to a rope to impart additional mass to the tip must consider the desired action and pliability of the loop in order to be affective for the specific purpose of heading, calf roping, or heeling.

In order to rope a steer around the horns, headers and steer ropers will generally have greater success if they use a rope of softer lay (primarily extra-extra-soft to soft), and one that is smaller in diameter, and thus lighter, than what a heeler would typically use. This is because headers and steer ropers generally throw a smaller loop, and it is relatively difficult, even for an experienced roper, to swing a small loop with a stiff rope. The reason headers and steer ropers throw a smaller, and softer loop is so the loop will curl around the horns with greater ease and thrift and remain taught until the slack may be extracted, and so that the slack may be extracted more rapidly than from a larger stiffer loop. The softer the lay, the less resistance there will be for the rope to bend around the base of the right horn, allowing the tip to continue to rotate toward the left horn. Once the loop reaches the left horn, the softer the lay, the greater the tendency will be for the loop to rotate around the base of the left horn and initiate the action necessary to create the curl on the neck or shoulders that is most desirable to keep the rope taught until the slack may be extracted. The softer the lay, the smaller or tighter the curl may be. The weighting apparatus will be inside and part of the curl. The curl will not have a uniform radius, but more likely will resemble a section of a spiral, with very tight closure, any point on which may have a radius of 6 inches or less. Not only will any decrease in the pliability of the rope have a negative impact on the potential for the loop to curl, but it will also have an impact on how the slack is extracted and whether the animal is captured or escapes. In order to understand this, it is important to recognize that the process of extracting the slack from a head loop or a calf loop is substantially different than it is for a heel loop.

During the process of extracting the slack while heading or calf roping, the distance between the roper and the animal generally remains constant, and thus, the extraction of the slack is primarily the result of the roper's effort to manually pull the slack out of the loop. Conversely, the extraction of the slack during the heeling process results after the heeler delivers the loop, stops the horse and wraps the lariat around the saddle horn, and the continually moving animal creates ever-increasing distance from the roper, thus pulling the loop with his legs, resulting in the closure of the loop until it is taught. The consequential difference between the header pulling the slack, and the animal pulling the slack, is that a head loop or calf loop is presented the potential to open back up, which will likely have negative consequences as described below. Conversely, the size of a heel loop is ever decreasing once it reaches the legs of the animal. And if it were, for instance, to bounce and stay open, that is a desired affect for heeling, as it would increase the opportunity for the steer to step into the loop. Thus, any weighting mechanism used for heeling that imparted additional stiffness may be beneficial to a heeler. Conversely, any stiffness or reduction in pliability whatsoever that may be imparted on a head or a calf loop, is detrimental to capturing the head or horns of an animal. Thus, any such embodiment for a head rope and a calf rope must be as flexible as possible.

Any appurtenance added to a head loop that decreases the pliability will decrease the tendency of the desired curl to develop on the animal's neck or shoulders, and even if developed, will have a greater immediate tendency to bounce and/or want to open back up, thus; a.) giving the animal the opportunity to shake the rope off of the head; b.) waving back off the horns; c.) dropping over the steer's nose, which may choke the steer, thus causing it to hop more sporadically, making it more difficult for the heeler; or d.) allowing the steer to step into or run through the loop, until the slack may be extracted by the roper. With regards to extraction of the slack one must also consider the drag on the rope.

As previously discussed, for headers and calf ropers, a softer, more pliable rope will create more action to keep the rope taught until the slack may be extracted by the roper. When heading or calf roping, the relative angle of extraction between that portion of the loop inside the honda (the slack in the loop), and that portion of the rope just outside the honda, is substantially less than 90 degrees, and often very close to zero degrees, creating significantly more contact between the rope and the burner, and a significant amount of drag, compared to that created while heeling. The importance of minimizing drag between the honda and the rope is recognized by Motsinger in U.S. Pat. No. 6,789,509. For headers and calf ropers, at such a small angle, a smaller, softer more pliable rope will have less drag than a larger diameter, less pliable rope such as one that may be used for heeling. Any appurtenance that is added to a loop that increases the overall diameter and reduces the pliability of the rope will further increase the drag during slack extraction, and thus increase the potential for the loop to open up. The greater the diameter of the appurtenance, the greater the drag, and the less pliable the lariat will be and the greater the difficulty and slower the speed of extracting the slack. Also, the greater the diameter of the appurtenance, the greater the chance that the appurtenance will catch at the burner as the slack is being extracted. Even when the appurtenance is tapered, such as with Smiths invention, the thinness of the material at the ends of the taper, would have more contact with the honda of a head loop or a calf loop, and will thus be less effective and have a greater tendency to catch on the burner or honda and peel away from the lariat, particularly if there is no method of adhesion applied to the appurtenance, thus further increasing the drag and decreasing the longevity of the appurtenance, and subsequently the lariat.

Conversely, a heeler will generally be more successful with a rope that is stiffer (primarily medium-soft to hard) so that the loop will have a greater tendency to stay open and create a better trap to improve the opportunity for the steer to step or jump into the loop. A heeler generally delivers a loop that is approximately 30% larger and 50% heavier than a head loop, again, for the purpose of increasing the chances of catching both feet. A lariat for heeling is generally more effective if it is larger and heavier because it will have less of a tendency to bounce or be kicked out by the steer. Additionally, because a heel rope is essentially delivered in a sideways manner, with the intention of the entire loop wrapping around the legs, a much greater percentage weight increase, up to 50 percent, may be added and still be effective. Conversely, because a head rope is softer and thrown relatively flat, any weight increase greater than 20% will have a tendency to pull the softer loop closed, and/or pull the tip down between the horns, causing the steer to be missed. It should also be noted that if one were to increase the diameter of any particular section of the loop of any type of rope, a heel rope will be least affected by such an appurtenance because of the relative stiffness of the rope and the angle of slack extraction—between the portion of the loop inside the honda and the portion outside the honda, which is generally between 130 and 180 degrees, thus creating substantially less drag between the rope and the honda during closure of the loop. Plus, an increase in the stiffness of the tip, to an extent that does not substantially affect the ability to swing and deliver the loop, is actually beneficial for a heeler.

As previously explained, the basic components of lariats have changed little over time. The improvement that the present invention provides is adding weight to the tip of the loop while maintaining the flexibility of the loop, and minimizing the increase in the diameter of the loop, particularly at the ends of the weighting embodiment, without having to taper the ends, in order to improve the performance of ropes used for heading, steer roping, and calf roping, as well as heeling, by covering that portion of a lariat with heat shrink-wrap tubing in conjunction with an adhesive elastic material. The purpose of the weight is to add more mass to the tip of the loop, and thus increase the angular momentum of the tip in order to improve the control and action of the loop as it is swung and delivered.

BRIEF DESCRIPTION OF THE DRAWINGS

A more complete understanding of the present invention may be had by reference to the following descriptions when taken in connection with the accompanying Drawings, wherein.

DETAILED DESCRIPTION OF DRAWINGS

Figure 1:
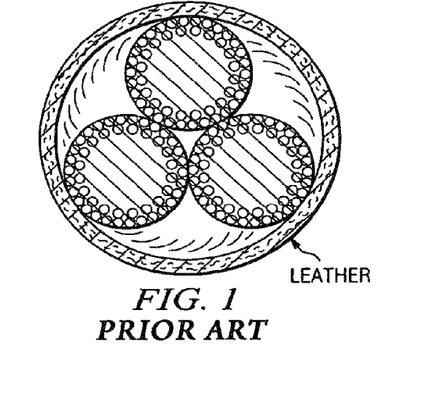
FIG. 1 and FIG. 2 depict two embodiments of the prior art, and are identical to FIGS. 3 and 4 of U.S. Pat. No. 4,648,352 and illustrate the methods of using leather with tapered ends and molded plastic with tapered ends.
Figure 2:
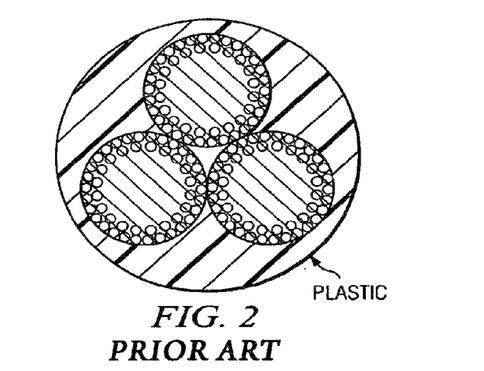
Figure 3:
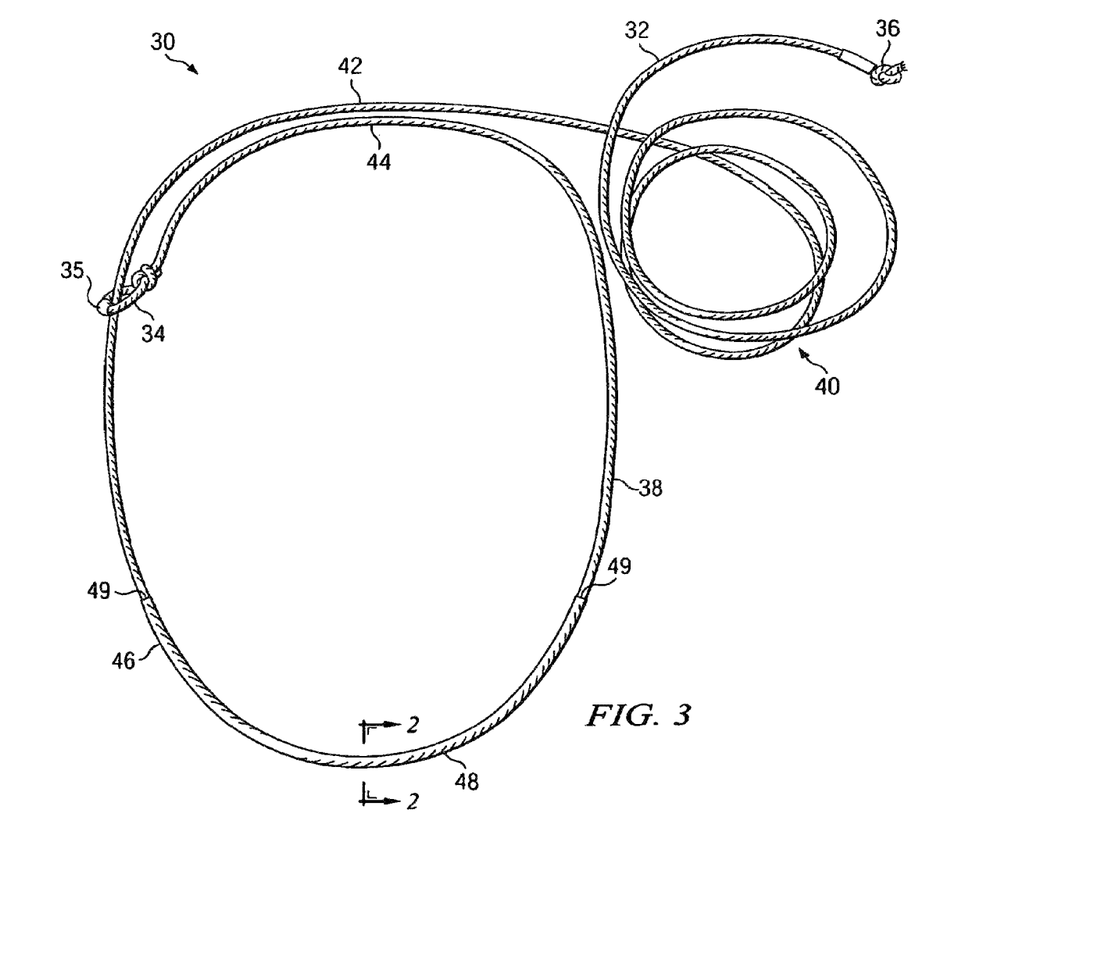
FIG. 3 is a cross-sectional view of a lariat comprising a fourth embodiment of the invention.
Figure 4:
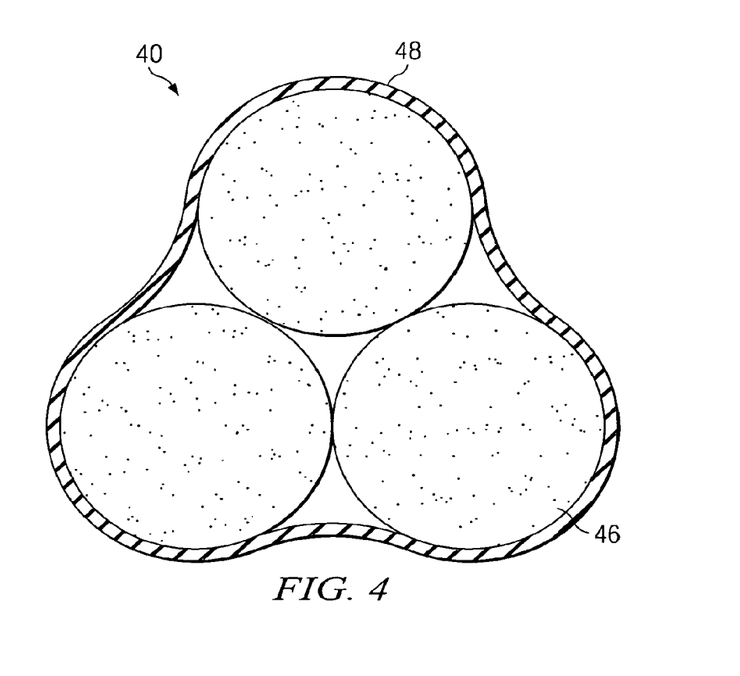
FIG. 4 is a perspective view of a header mounted on horseback throwing a lariat at the horn's of a steer, and in particular showing the action or curl that is desired and which the present invention improves.
Figure 5:
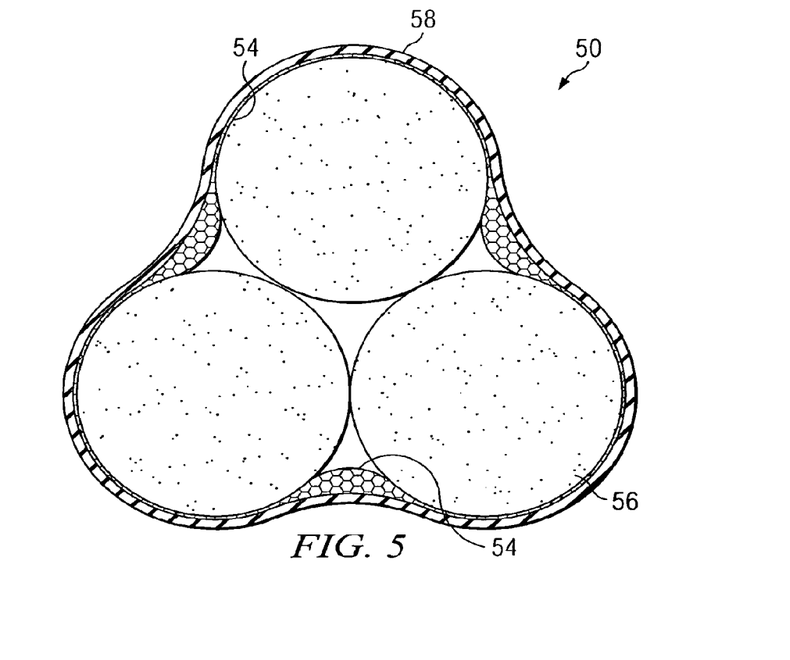
FIG. 5 is an overhead view of a head loop that has been delivered, with the curl developed and the slack yet to be extracted.
Figure 6:
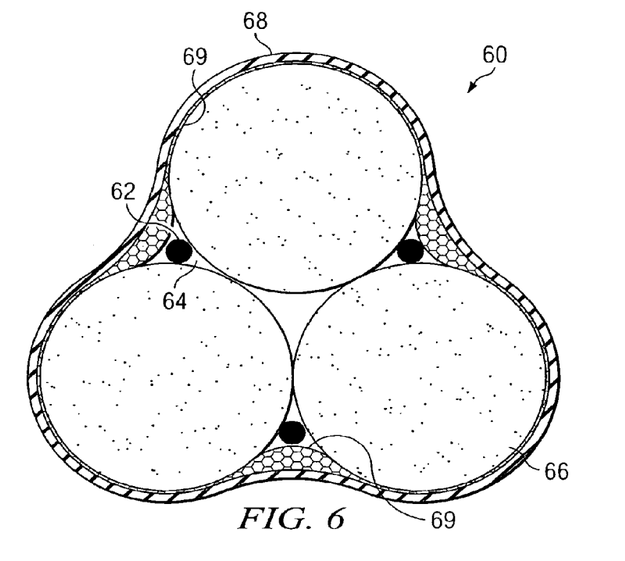
FIG. 6 is a perspective view of a heeler mounted on horseback throwing a lariat at the hind legs of a steer.

Referring now to the Drawings, and in particular to FIG. 1, there is shown the leather embodiment of the prior art, wherein, so long as the embodiments are drawn to scale relative to each other, the leather embodiment is approximately 1 mm thick, given that the average diameter of a 3-strand rope at the time of the invention was about 10 mm, and thus a diametrical increase of approximately 20%, understanding that the leather could be thicker or thinner, so long as it is sufficiently thick to promote reasonable durability and longevity, and thus proper adherence to the lariat without peeling or slipping during use, but regardless, being tapered at the ends;

Referring now to FIG. 2, there is shown the molded plastic embodiment of the prior art, wherein, so long as the embodiments are drawn generally to scale relative to each other, the plastic embodiment varies from 1 to 2.5 mm thick, and thus a diametrical increase of approximately 20%, understanding that the molded plastic may be thicker or thinner, so long as it is sufficiently thick for reasonable durability and longevity, and thus proper adherence to the lariat without peeling or slipping during use, but regardless, being tapered at the ends;

Referring now to FIG. 3, there is shown a lariat 30 comprising a rope 32 which has a honda 34 with a burner 35 at one end and a tail 36 at the other. The tail 36 extends through the honda 34, with a burner 35, to form a loop 38, and the remainder of the rope 32 is wound to form coils 40 that a user of the lariat 30 can easily hold and carry. When the lariat 30 is to be used to catch animals, the user grabs the loop 38 at the portion 42 along with the spoke 44 of the line 32. The user then throws the loop 38 at the animal's head or legs in order to catch it.

A weighted portion 46, the ends 49 of which are not tapered is located at the tip 48 of the loop 38. The weighted portion 46 may comprise a length of shrink-wrap tubing such as polyolefin or neoprene, with or without an adhesive lining, and with or without one or more malleable metal wires of a specified length wrapped around the lariat in the grooves between the strands. The weighted portion 46 improves the curl or action of the tip 48 of the loop 38 as it passes over and about the neck or horns of an animal, or across the legs and under an animal, which results in a higher likelihood that the animal will be caught.

Figure 7:
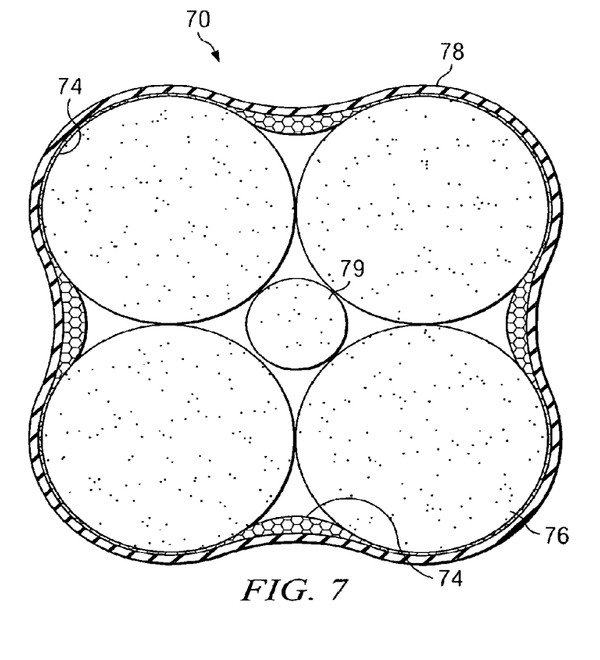

Referring to FIG. 7, there is shown a cross-sectional view of the embodiment of the invention. A 4-strand lariat 70 has a length of shrink-wrap tubing 78 secured around the strands 76 with an elastic adhesive lining 74. Also shown is a center strand 79 that is common in some lariats.

Figure 8:
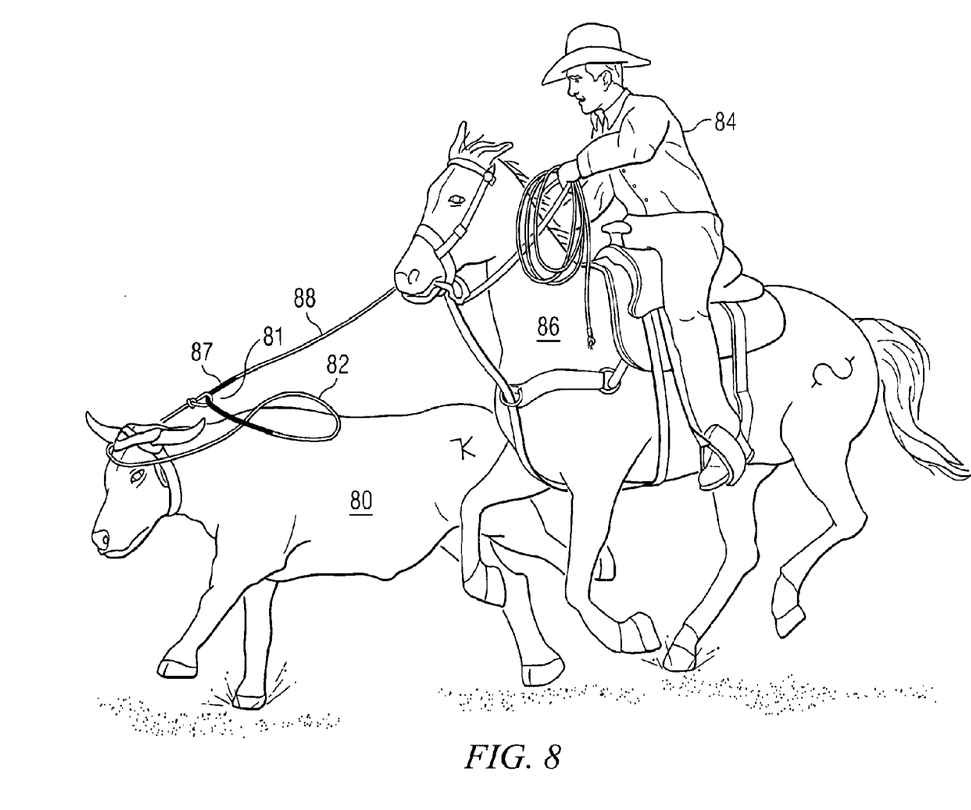

Referring to FIG. 8, there is shown a perspective view of a header 84 mounted on a horse 86 throwing a lariat 88 with the present invention 87 at a steer 80, and in particular showing the action or curl 82 that is desired and which the present invention improves. The curl 82 is shown behind the steer's head and neck 80, which is the most desirable positioning, and which is what the invention promotes. The angle of slack extraction 81 at the honda is shown.

Figure 9:
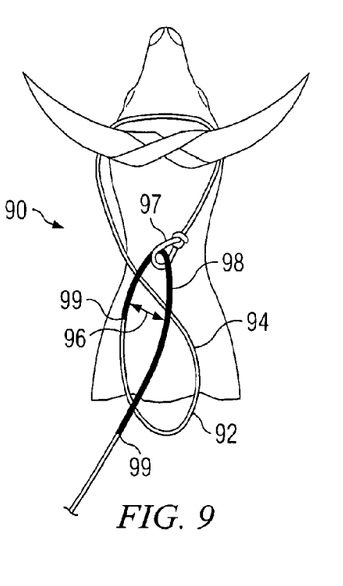
Figure 10:
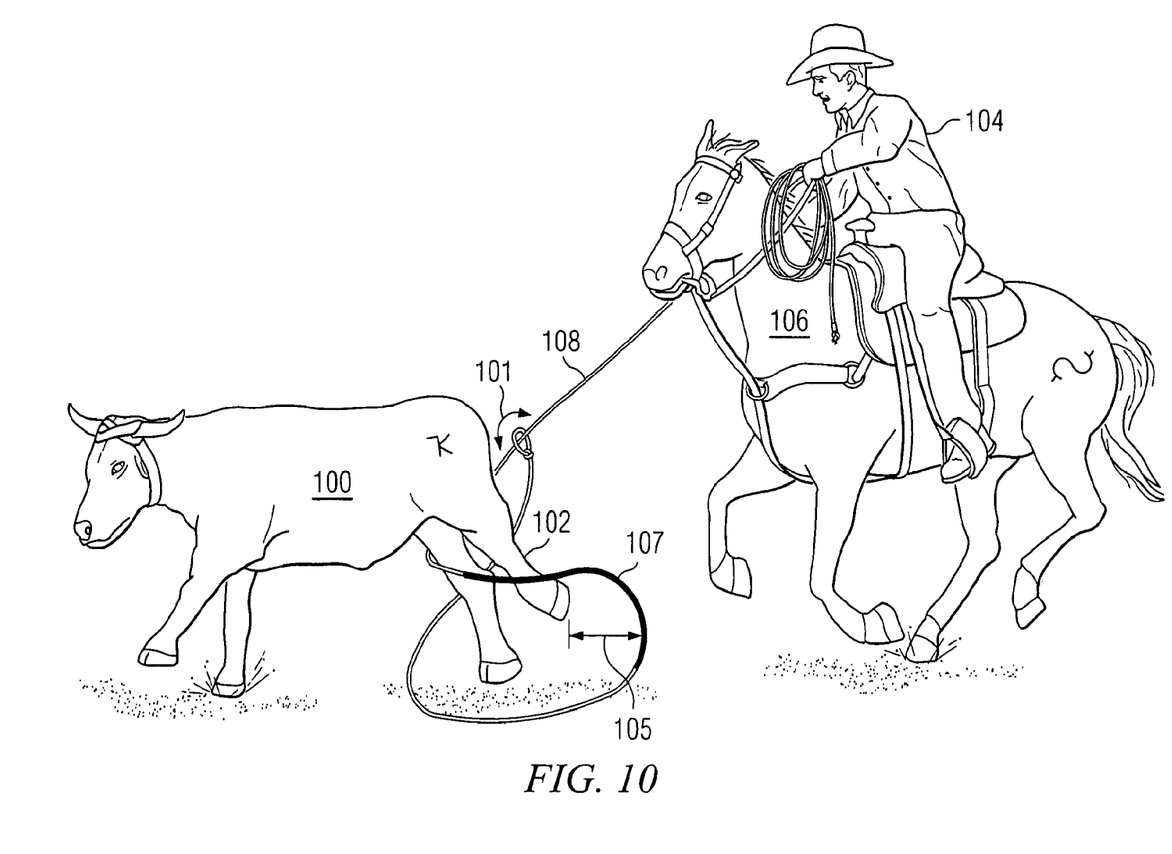

Referring now to FIG. 9, there is shown an overhead view of a head loop 90 immediately after delivery, wherein the curl 92 is developed, and the slack 94 is being extracted from the loop 90. The angle of extraction 96 and the present invention 98, the ends 99 of which are not tapered, are shown relative to the position of the honda 97.

Referring to FIG. 7, there is shown a perspective view of a heeler 74 mounted on a horse 106 throwing a lariat 78 with the present invention 107 at the hind legs 72 of a steer 70, and in particular showing the follow through 75 that is desired and which the present invention improves. The angle of closure 71 is shown.

Although preferred embodiments of the invention have been illustrated in the accompanying Drawings and described in the foregoing Detailed Description, it will be understood that the invention is not limited to the embodiments disclosed, but is capable of numerous rearrangements, modifications, and substitutions of parts and elements without departing from the spirit of the invention.

The invention claimed is:

1. A lariat comprising at least three elongate, flexible strands twisted about one another to form a rope of predetermined lay, or stiffness, and length;

wherein the lay is established by a predetermined number of twists per length of rope, wherein the predetermined number of twists per length of rope is within a range that produces a lay of rope ranging from extra-extra-soft to hard;

the length of rope having a honda at one end and a tail at the other end;

the tail extending through the honda to form a loop, and a tip of the loop being that general portion of the rope that is opposite the hand where the rope is held for competitive use;

and a length of shrink-wrap tubing, having non-tapered ends, and of uniform and predetermined rigidity and weight, and having an adhesive lining, said tubing applied to the rope by heat; wherein the rigidity and weight are predetermined by pre-selection of a combination of tubing and adhesive of predetermined thickness, wherein said thickness is within a range such that the rigidity of the tubing does not negatively impact the performance of the rope by imparting stiffness to that portion of the rope to which it is applied;

wherein said weight imparts mass to that portion of the loop to which the tubing and adhesive are applied, whereby the momentum of that portion of the loop is increased during competitive use;

and whereby competitive use of the rope results in friction between said tubing and said honda, as well as friction between said tubing and other elements that may come into contact with said tubing, said tubing is secured to said rope by said adhesive at the ends of the tubing and throughout the length of the tubing, whereby tapering of the ends of the tubing is not necessary to inhibit fraying at the ends, and whereby said adhesive inhibits fraying or separation of any portion of the tubing from the rope, due to friction.

2. The lariat according to claim 1 wherein the section of the loop that is weighted is the tip of the loop.

3. The lariat according to claim 2 wherein the strands of the rope are made of polyester.

4. The lariat according to claim 1 wherein the strands of the rope are made of nylon.

5. The lariat according to claim 1 wherein the strands of the rope are made of a blend of polyester and nylon.

6. The lariat according to claim 1 wherein the strands of the rope are made of grass.

7. The lariat according to claim 1 wherein the shrink-wrap tubing is made of polyolefin.

8. The lariat according to claim 1 wherein the shrink-wrap tubing is made of polyvinylchloride.

9. The lariat of claim 1 where in the rope is comprised of more than 3 strands.

10. The lariat of claim 1 where the weighted section is any given section of any length on the loop.

* * * * *